April 24, 1945.  G. E. WALKER  2,374,632
PROCESS FOR SEPARATING CALCIUM VALUES FROM MAGNESIUM VALUES
Filed Oct. 29, 1942
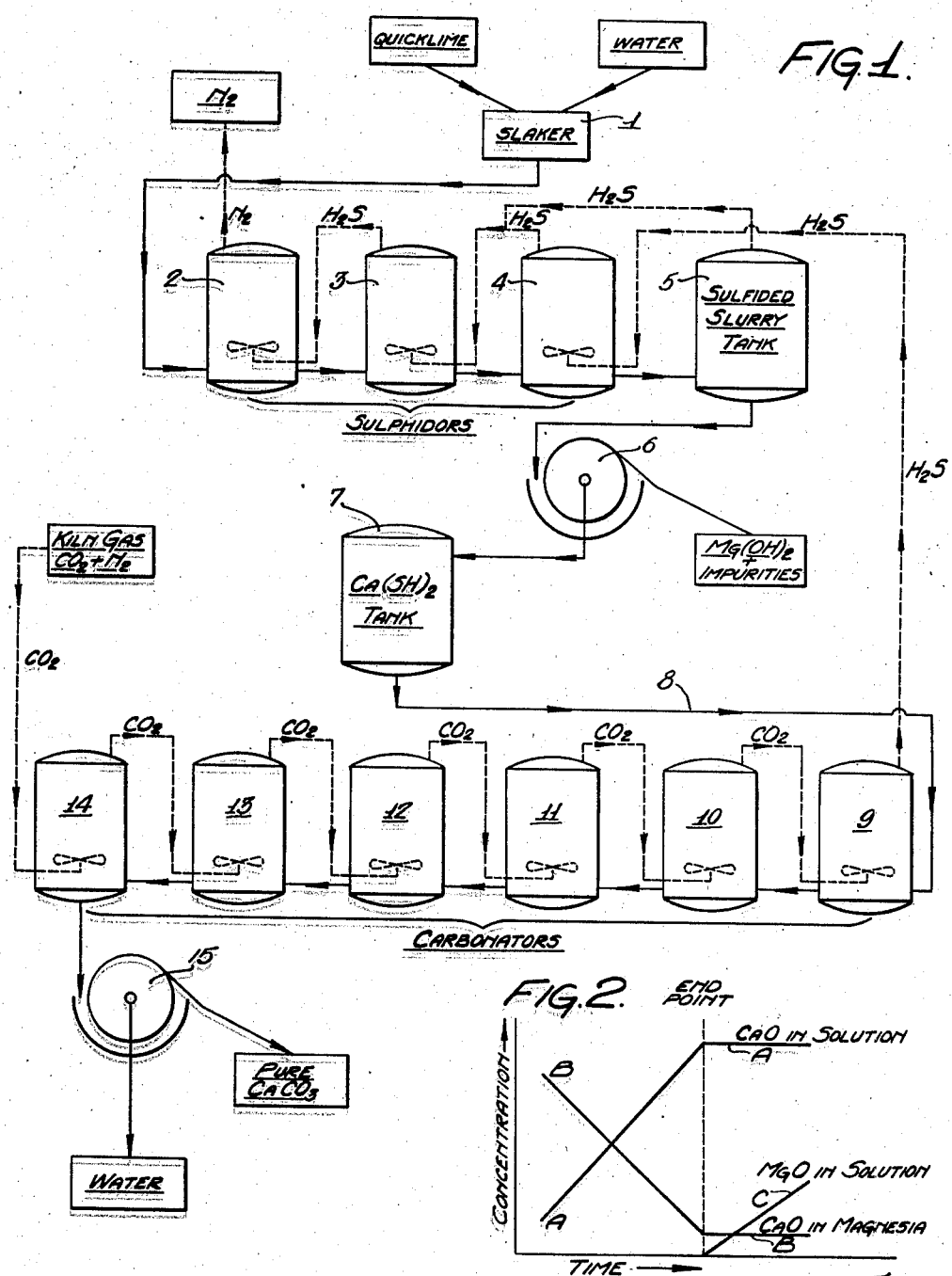
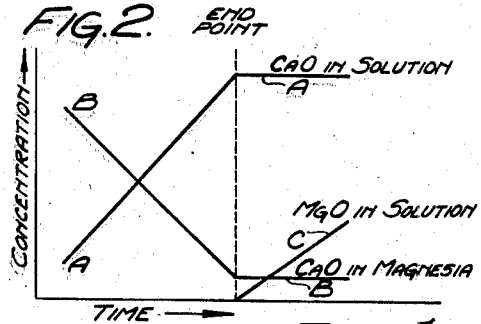
Inventor:
George E. Walker
by his Attorneys Patented Apr. 24, 1945

2,374,632

UNITED STATES PATENT OFFICE 2,374,632

PROCESS FOR SEPARATING CALCIUM VALUES FROM MAGNESIUM VALUES

George E. Walker, Paoli, Pa., assignor to Warner Company, Philadelphia, Pa., a corporation of Delaware Application October 29, 1942, Serial No. 463,802

8 Claims. (Cl. 23—201)

The present invention relates to a process for the separation of calcium values from magnesium values, and, more particularly, it relates to a simple and economical process by which it is possible to obtain relatively pure calcium values on the one hand, and magnesium values relatively low in calcium values on the other, from substances containing calcium and magnesium compounds, such as lime.

One object of the present invention is to provide a method for the preparation of relatively pure calcium carbonate or oxide from impurity-contaminated materials containing calcium oxide or hydroxide or materials capable of being transformed into calcium oxide or hydroxide, which process insures substantially complete separation of the calcium values of the calcium oxide or hydroxide from the other components of the material treated.

Another object of the present invention is to provide a process by which magnesium oxide and/or hydroxide relatively low in calcium content may be obtained from materials containing both lime and magnesia.

A further object is to provide a process for the separation of the calcium values from the magnesium values contained in materials comprising a mixture of the two, which process is continuously operable and practical for use in large scale commercial operations.

Still another object of the invention is to provide a method for the treatment of calcium- and magnesium-containing materials in which, in the separation of the calcium values from the magnesium values, the calcium values are dissolved and the magnesium values suspended in the solution of the calcium values are more easily filtered than has heretofore been the case.

Other objects will be apparent from a consideration of the specification and claims.

In copending application Serial Number 315,851, filed January 26, 1940, by James A. Murray, (now Patent No. 2,317,396) there is described and claimed a "Process for separating calcium values from magnesium values," in which a lime milk is treated with a stream of hydrogen sulphide, the stream being discontinued as soon as hydrogen sulphide is evident in the effluent gas, at which point all but an immaterial amount of the calcium hydroxide has been converted to calcium hydrosulphide and substantially none of the magnesium oxide and/or hydroxide has been converted to magnesium hydrosulphide. The solution of calcium hydrosulphide is thereafter separated from the undissolved constituents, including the magnesium compounds. While the process of the copending application is entirely feasible for a batch operation, it requires careful control and cannot be employed in a continuously operable process. Furthermore, the undissolved material, mainly magnesium oxide and/or hydroxide, is more or less gelatinous and is, therefore, difficult to remove from the calcium hydrosulphide solution by filtration. In fact, at times, the filtering operation is so extremely slow that the process may involve high filtration costs. As will hereinafter appear, the process of the present invention does not require careful control of the amount of hydrogen sulphide brought into contact with the material treated, and the process may be continuously operated on as large a commercial scale as is desired. In addition, the magnesium oxide and/or hydroxide and other undissolved material may be rendered more easily removable from the solution of calcium hydrosulphide with the result that the filtering costs may be reduced.

In the drawing:

Figure 1 illustrates a flow sheet representative of the process; and

Figure 2 is a diagram showing the concentration relations which exist when a suspension of calcium hydroxide and magnesium hydroxide and/or oxide is treated with hydrogen sulphide.

The present invention is applicable for the treatment of a wide variety of natural and industrial products containing calcium oxide or hydroxide or materials capable of being transformed into those compounds, since practically all natural or industrial products of this type also contain magnesium oxide or hydroxide or materials capable of being converted into magnesium oxide or hydroxide. The materials most suited to treatment by the process are the limestones and magnesites. As an example of an industrial product suitable for treatment, the waste sludge obtained in the production of acetylene from calcium carbide may be cited.

Whatever the starting material, it must contain or be converted into calcium hydroxide and magnesium oxide and/or hydroxide. The process may best be illustrated by its application to dolomitic limestone which contains appreciable amounts of magnesium carbonate. The material may be calcined to form dolomitic quicklime, and the latter may be slaked or hydrated to form calcium hydroxide and magnesium oxide and hydroxide. As is well-known, slaking of quicklime containing magnesium oxide results in the conversion of substantially all the calcium oxide into calcium hydroxide, but, in view of the greater difficulties encountered in the conversion of magnesium oxide into magnesium hydroxide, some magnesium oxide may remain unslaked, depending upon the slaking conditions. So far as the present invention is concerned, the relative amount of the residual unslaked magnesium oxide is immaterial. The separation of the calcium values from the magnesium values is effected by the use of hydrogen sulphide, and, as will hereinafter be discussed in detail, it is possible by the process sequence control of the present invention to obtain a calcium hydrosulphide solution substantially free from magnesium oxide and/or hydroxide and from any other impurities of the material treated which are insoluble in the alkaline hydrosulphide solution. The substantially pure calcium hydrosulphide solution is separated from the insoluble magnesium oxide and/or hydroxide and other insoluble impurities by filtration. The calcium hydrosulphide solution is then treated with carbon dioxide gas to precipitate calcium carbonate and to regenerate hydrogen sulphide which is returned to the sulphiding system for reuse. The calcium carbonate is filtered from the solution and may be distributed to the trade for use as a pigment, filler or the like, or may be burned to form a calcium oxide of unusual purity. The magnesium oxide and/or hydroxide separated from the calcium hydrosulphide solution may be burned to form refractory magnesium oxide or may be otherwise processed.

The general principle of the separation process may best be understood by reference to the flow sheet of Figure 1, wherein the solid lines represent the flow of liquids and/or solids, and the dotted lines represent the flow of gas.

Dolomitic quicklime and water are added continuously to a slaker 1 which may be of conventional design. The milk of lime produced therein flows consecutively through a plurality of gas absorbers 2, 3 and 4, termed sulphidors, wherein it is treated countercurrently with a gas containing hydrogen sulphide. As will hereinafter appear, sufficient hydrogen sulphide is passed into the absorbers to convert all of the calcium hydroxide into calcium hydrosulphide, and at least a portion of the magnesium oxide and/or hydroxide into magnesium hydrosulphide. From the final absorber in the sulphiding system, the liquor, now consisting of a suspension of the unconverted magnesium oxide and/or hydroxide and impurities in a solution of calcium hydrosulphide and magnesium hydrosulphide, flows to a tank 5 designated the "Sulphided Slurry Tank" which is provided with a heat source (not shown) so that it may be maintained at a temperature above the decomposition point of magnesium hydrosulphide to convert this compound into magnesium hydroxide, in granular form, as will hereinafter be explained. The material from tank 5 is fed to filter 6. The filter cake consists primarily of magnesium hydroxide and/or oxide.

The filtrate from filter 6 is a clear liquor containing calcium hydrosulphide in solution and passes to tank 7, designated as the $Ca(SH)_2$ tank, from which it flows through pipe line 8 into the first of a plurality of absorbers (carbonators) 9, and from there the liquor and suspended solids flow consecutively through absorbers 10, 11, 12, 13 and 14. In these absorbers, the liquid is treated countercurrently with a stream of gas containing carbon dioxide, for example, kiln gas, and the soluble calcium hydrosulphide is converted into the insoluble calcium carbonate. The carbon dioxide enters absorber 14 and passes consecutively through absorbers 13, 12, 11, 10 and 9, wherein the carbon dioxide is absorbed and hydrogen sulphide is evolved. The hydrogen sulphide leaving absorber 9 is then passed consecutively through absorbers (sulphidors) 4, 3 and 2, wherein it is brought into contact with the milk of lime and the hydrogen sulphide is absorbed. The effluent liquor from the final absorber consists of a suspension of calcium carbonate in water and is filtered in filter 15 to recover the calcium carbonate.

It is to be understood that the number of sulphidors and carbonators mentioned above and shown in the drawing are merely illustrative, and a smaller or larger number may be employed if desired. It is only necessary to have sufficient absorbing equipment to obtain the desired reaction and to insure that the gas leaving the first absorber in the liquid flow does not contain an appreciable amount of the gas relied upon to produce the reaction in the absorbers of the series.

Since both calcium hydroxide and magnesium oxide and/or hydroxide are normally soluble in the presence of hydrogen sulphide, a calcium carbonate contaminated by magnesium compounds, and, therefore, of diminished economic value, will be obtained unless special provision is made to furnish a hydrosulphide solution for carbonation which is free from magnesium hydrosulphide. The procedure by which this is accomplished is an important feature of the present invention.

Figure 2 shows the concentration reactions which exist when a suspension of calcium hydroxide and magnesium oxide and/or hydroxide is treated with hydrogen sulphide solution. It will be noted that the concentration of dissolved calcium increases steadily until the "end point" is reached, after which it shows little or no increase. Simultaneously, the concentration of calcium oxide in the magnesium oxide and/or hydroxide decreases steadily until the end point is reached, after which there is little or no further decrease. Prior to the end point, no magnesium oxide and/or hydroxide is found in solution, but immediately subsequent thereto, magnesium oxide and/or hydroxide starts to dissolve, forming magnesium hydrosulphide. While operating as a batch system, the conditions may be so controlled that the addition of hydrogen sulphide may be stopped as soon as the end point is reached, as described and claimed in copending application Serial No. 315,851, hereinabove referred to, this requires accurate control and is not feasible in a continuously operating process.

In accordance with the present invention, accurate control is not necessary in the sulphiding step—in fact, the sulphiding treatment is carried beyond the end point to insure complete solubilization of the calcium values. This results in the conversion of at least a portion of the magnesium oxide and/or hydroxide into magnesium hydrosulphide, and a subsequent heat treatment, to be further described, is relied upon to decompose the magnesium hydrosulphide to form insoluble magnesium hydroxide. Upon filtration, a substantially magnesium-free calcium hydrosulphide solution is obtained for conversion into calcium carbonate of a high degree of purity.

Referring further to the sulphiding treatment, the calcium hydroxide and magnesium oxide and/or hydroxide suspended in water flow from the slaker to the sulphiding equipment in which it is treated with hydrogen sulphide, advantageously with a gas comprising a mixture of hydrogen sulphide and an inert gas, such as nitrogen, for instance a gas containing 40% to 50% hydrogen sulphide. The amount of calcium hydroxide and magnesium oxide and/or hydroxide suspended in the water is relatively immaterial, but the use of a thin slurry is recommended, for example 80 to 130 grams per liter of solids in the slurry. It has been found that the sulphiding treatment is advantageously conducted in a plurality of absorbers, preferably three, each of which performs a specific function in the process. The first absorber in the liquid flow contains milk of lime, substantially unreacted, serving as a safety trap to prevent escape of hydrogen sulphide to the atmosphere. The main absorption of hydrogen sulphide takes place in the second absorber, and the third absorber serves to insure complete solubilization of the calcium hydroxide and to convert at least a portion of the magnesium oxide and/or hydroxide into magnesium hydrosulphide.

No temperature control of the sulphidors is required, and each may be permitted to reach the equilibrium of its reaction endotherm. In a typical case, the temperature ranged from about 130° F. when the liquid treated was substantially calcium hydroxide to about 160° F. at the time of complete solubilization of the calcium hydroxide. The rate of flow and the concentration of the hydrogen sulphide in the gas in any particular case will be selected to obtain the results herein described, and will be governed by the equipment employed, the amount of slaked lime treated in a given time and the like. For continuous operation, a controller may be placed in the gas line between the first and second absorbers, set at a low, but positive, concentration of hydrogen sulphide, say 2%, and arranged so that, when the concentration of hydrogen sulphide at this point in the absorption system exceeds that at which the controller is set, a greater flow of milk of lime from the slaker to the first absorber will take place.

In view of the fact that there is a continuous flow of substantially unreacted milk of lime into the second absorber from the first and a continuous flow from the second to the third, there exists the possibility of a small amount of calcium hydroxide leaving the second absorber without being reacted. The third absorber, therefore, functions to complete the solution of any small amount of calcium hydroxide entering from the second absorber and to dissolve at least a portion of the magnesium oxide and/or hydroxide. At times, of course, the entire calcium hydroxide content and some of the magnesium oxide and/or hydroxide may be rendered soluble in the second absorber.

Since the sulphiding treatment is carried to the point where magnesium oxide and/or hydroxide is found in the solution, all of the calcium hydroxide has necessarily been converted into calcium hydrosulphide. While, in order to insure complete solubilization of the calcium hydroxide, it is only necessary to dissolve a very small amount of the magnesium oxide and/or hydroxide, it is desirable to dissolve an appreciable amount to avoid the necessity of careful control of the process. In addition, as previously stated, the magnesium oxide and/or hydroxide which has been dissolved by the hydrogen sulphide precipitates in a granular, easily filtrable form upon the subjection to the heating step of the process, and, therefore, in order to produce a more easily filtrable suspension of magnesium hydroxide and impurities, it is often desirable to dissolve a relatively large amount of the magnesium oxide and/or hydroxide. Obviously, the ease of filtration of the suspension is increased as the ratio of the precipitated magnesium hydroxide to the other suspended material is increased. In certain instances, for example, when the milk of lime contains a relatively small amount of magnesium oxide and/or hydroxide, all of the magnesium oxide and/or hydroxide present may be rendered soluble by the hydrogen sulphide, but usually only a portion of the magnesium content of the milk of lime treated will be converted to magnesium hydrosulphide. The amount of magnesium oxide and/or hydroxide dissolved in any particular operation will be determined by the various economic factors. As illustrative figures, the amount of magnesium oxide and/or hydroxide dissolved, figured as MgO, may range from 2 or 3 grams per liter or less to 10 to 14 grams per liter or more.

The sulphided material flows to a tank (5, Fig. 1) and is heated to decompose the magnesium hydrosulphide and to form granular magnesium hydroxide. The hydrogen sulphide liberated may advantageously be returned to the hydrogen sulphide supply to the absorbers for reuse, for example, to the hydrogen sulphide entering the second absorber. The heating step is carried out at a temperature and for a time sufficient to decompose the solubilized magnesium oxide and/or hydroxide so that upon filtration a magnesium-free solution of calcium hydrosulphide will be obtained. The decomposition of the magnesium hydrosulphide is dependent on a temperature-time relationship, that is, the lower the temperature, the longer will be the time of heating required. Temperatures as low as 65° C., or lower, may be used, but such temperatures require a relatively long time of heating. A temperature of at least 75° C. or 80° C. is usually employed, and higher temperatures will reduce the time required for decomposition. The solution may, if desired, be raised to just below the decomposition point of the calcium hydrosulphide, but this is of no advantage, and the use of temperatures between 80° and 90° C. is preferred. The calcium hydrosulphide in the solution does not decompose to any appreciable extent during the heating treatment described, and, therefore, the calcium content of the magnesium values obtained as a result of the process is not increased thereby. The suspension of magnesium hydroxide is separated from the solution of calcium hydrosulphide, for example, by filtration.

The clear filtrate of calcium hydrosulphide solution is processed to recover its calcium values and its sulphide values. The liquor is, therefore, passed countercurrently to carbon dioxide gas through a plurality of gas absorbers wherein the calcium hydrosulphide solution is decomposed by the carbon dioxide, forming calcium carbonate and hydrogen sulphide. The carbon dioxide is advantageously provided by a gaseous mixture of carbon dioxide and an inert gas such as nitrogen, for example, a gas containing 27% to 35% carbon dioxide. In the case kiln gas is available, it will usually be employed. The use of a plurality of absorbers is employed for reasons similar to those set forth in the consideration of the sulphiding system. The reaction between carbon dioxide and calcium hydrosulphide, however, is not as rapid as that between hydrogen sulphide and calcium hydroxide. Hence, more absorber capacity is required, and it has been found that, using a standard commercial gas absorber of good efficiency, five, preferably six absorbers, in series are desirable. The first absorber in the gas stream acts primarily as a clean-up absorber for the small amounts of calcium hydrosulphide which have not reacted in the other absorbers. The bulk of the reaction occurs in the second and third absorbers, and the remaining absorbers are employed to remove the small amounts of residual carbon dioxide from the gas, so that a substantially carbon-dioxide-free hydrogen sulphide gas may be returned to the sulphiding system for use therein. The suspension from the last absorber in the liquid flow is filtered or otherwise treated to remove the substantially pure calcium carbonate therefrom. The rate of flow and concentration of carbon dioxide in any particular case will be selected to obtain the results described, and will be governed by the equipment employed, the amount of calcium hydrosulphide in the solution treated in a given time, and the like.

The process of the present invention may be operated as a batch system, if desired, but it is especially adapted for continuous operation, either as an entirety or in one or more of the several steps thereof. When the process throughout is operated in a continuous manner, the quicklime and water is fed continuously to the slaker which in turn delivers the milk of lime to the first absorber in the liquid flow. The liquid and suspension flows continuously through the sulphidors to the tank in which the solution and suspension are heated to decompose the magnesium hydrosulphide, the flow through the tank being adjusted so that the material will be retained therein for a time sufficient to decompose the magnesium hydrosulphide. The material from this tank flows to a continuously operating filter which removes the magnesium hydroxide and impurities as the filter cake. The filtrate consisting of the calcium hydrosulphide solution passes into a feed box for the carbonators from which it flows to the first carbonator in the liquid flow. The solution with the calcium carbonate in suspension flows through the carbonators in the series, and the calcium carbonate is filtered from the solution by a continuously operating filter. The hydrogen sulphide and carbon dioxide each pass countercurrently to the liquid flow in their respective absorbing systems.

The invention disclosed is operable with a variety of equipment. In particular, wherever a plurality of absorbers is specified, reference is made more to the separation of the functions of the absorption operation into its component parts rather than to a specific type or number of machines.

Considerable modification is possible in the steps of the process, as well as in the conditions employed in the individual steps, without departing from the essential features of the invention.

I claim:

1. The steps in the process of separating calcium values from magnesium values associated therewith in a product resulting from slaking a mixture of the oxides of calcium and magnesium which comprises treating an aqueous suspension thereof with hydrogen sulphide and converting the calcium hydroxide into calcium hydrosulphide and at least a portion of the magnesium values into magnesium hydrosulphide, and heating the said sulphided material to a temperature below the decomposition point of calcium hydrosulphide and decomposing the magnesium hydrosulphide to precipitate granular magnesium hydroxide and to liberate hydrogen sulphide, whereby a solution of calcium hydrosulphide containing substantially all of the calcium values present as calcium hydroxide in the material treated and substantially free from magnesium values is obtained.

2. The process of separating calcium values from magnesium values associated therewith in a product resulting from slaking a mixture of the oxides of calcium and magnesium which comprises treating an aqueous suspension thereof with hydrogen sulphide and converting the calcium hydroxide into calcium hydrosulphide and at least a portion of the magnesium values into magnesium hydrosulphide, heating the said sulphided material to a temperature below the decomposition point of calcium hydrosulphide and decomposing the magnesium hydrosulphide to precipitate granular magnesium hydroxide and to liberate hydrogen sulphide, separating the calcium hydrosulphide solution from the suspended solids, carbonating the said solution to convert the calcium hydrosulphide into calcium carbonate and to liberate hydrogen sulphide, and separating the calcium carbonate from the solution.

3. The process of separating calcium values from magnesium values associated therewith in a product resulting from slaking a mixture of the oxides of calcium and magnesium which comprises passing an aqueous suspension thereof through an absorption system, passing hydrogen sulphide countercurrently to said suspension in said system and converting the calcium hydroxide into calcium hydrosulphide and at least a portion of the magnesium values into magnesium hydrosulphide, discharging the said sulphided material from said absorption system, heating the said sulphided material to a temperature below the decomposition point of calcium hydrosulphide and decomposing the magnesium hydrosulphide to precipitate granular magnesium hydroxide and to liberate hydrogen sulphide, separating the calcium hydrosulphide solution from the suspended solids, passing said solution through an absorption system, carbonating the said solution by passing carbon dioxide countercurrently to said solution in said system to convert the calcium hydrosulphide into calcium carbonate and to liberate hydrogen sulphide, substantially free from carbon dioxide, returning the hydrogen sulphide to the sulphiding step of the process, and separating the calcium carbonate from the solution.

4. The process of claim 3 wherein only a portion of the magnesium values is converted into magnesium hydrosulphide, wherein the sulphided material is heated to a temperature between about 75° C. and about 90° C., and wherein the hydrogen sulphide liberated upon the heating of the sulphided material is returned to the sulphiding step of the process.

5. The process of separating calcium values from magnesium values associated therewith in a product resulting from slaking a mixture of the oxides of calcium and magnesium which comprises passing an aqueous suspension thereof through an absorption system, passing hydrogen sulphide countercurrently to said suspension in said system and converting the calcium hydroxide into calcium hydrosulphide and at least a portion of the magnesium values into magnesium hydrosulphide, the amount converted producing upon decomposition a granular precipitate of magnesium hydroxide in sufficient amount to aid materially in the filtration of the suspended solids from the calcium hydrosulphide solution, discharging the said sulphided material from said absorption system, heating the said sulphided material to a temperature below the decomposition point of calcium hydrosulphide and decomposing the magnesium hydrosulphide to precipitate granular magnesium hydroxide and to liberate hydrogen sulphide, returning the liberated hydrogen sulphide to the sulphiding step of the process, separating the calcium hydrosulphide solution from the suspended solids, passing said solution through an absorption system, carbonating the said solution by passing carbon dioxide countercurrently to said solution in said system to convert the calcium hydrosulphide into calcium carbonate and to provide hydrogen sulphide substantially free from carbon dioxide, returning the hydrogen sulphide to the sulphiding step of the process, and separating the calcium carbonate from the solution.

6. The process of claim 5 wherein the sulphided material is heated to a temperature between about 75° C. and about 90° C.

7. The continuously operable process of separating calcium values existing as calcium hydroxide from magnesium values associated therewith in a product resulting from slaking a mixture of the oxides of calcium and magnesium which comprises continuously passing a suspension thereof into and through an absorption system, continuously passing hydrogen sulphide countercurrently to said suspension in said system and converting the calcium hydroxide into calcium hydrosulphide and at least a portion of the magnesium values into magnesium hydrosulphide, continuously discharging the said sulphided material from said absorption system into an apparatus in which said sulphided material may be heated, heating the said sulphided material to a temperature below the decomposition point of calcium hydrosulphide and decomposing the magnesium hydrosulphide to precipitate granular magnesium hydroxide and to liberate hydrogen sulphide, returning the liberated hydrogen sulphide to the sulphiding step of the process, continuously removing the heated solution from said apparatus, continuously filtering said material to separate the calcium hydrosulphide solution from the suspended solids, continuously passing the filtrate into and through an absorption system, carbonating the said solution by continuously passing carbon dioxide countercurrently to said solution in said system to convert the calcium hydrosulphide into calcium carbonate and to provide hydrogen sulphide substantially free from carbon dioxide, returning the hydrogen sulphide to the sulphiding step of the process, and continuously filtering the calcium carbonate from the solution.

8. The process of claim 7 wherein the sulphided material is heated to a temperature between about 75° C. and about 90° C.

GEORGE E. WALKER.